United States Patent Office 3,341,596
Patented Sept. 12, 1967

3,341,596
METHOD FOR MAKING DIFLUOROAMINO COMPOUNDS
Richard P. Rhodes, Newark, and Leland K. Beach, Westfield, N.J., assignors to Esso Research and Engineering Company, a corporation of Delaware
No Drawing. Filed Jan. 27, 1960, Ser. No. 5,072
7 Claims. (Cl. 260—583)

The present invention relates to a method for preparing compounds containing difluoroamino groups. More specifically it relates to a two-step process for making difluoroamino compounds in which there is an $NF_2$ group attached to each carbon in the compound.

Strong oxidizers are quite valuable in the chemical field, especially for use with chemical fuels such as boron. Considerable work has been undertaken to make better oxidizing agents for fuels in order to impart high energy to rockets. Calculations indicate that compounds having relatively high $NF_2/C$ ratios are good oxidizers. It was recently found that alkanes having $NF_2$ groups attached directly to each carbon atom can be prepared from allyl halide-containing compounds. However, considerable difficulty was encountered in attempting to separate the product from the reaction mixture because of its explosive nature. Moreover, the yields of the desired compound were relatively low.

It is an object of the present invention to provide a process for making difluoroamino-rich compounds in a safer manner in good yields. Another object of the invention is to provide means for isolating these oxidizers in a substantially pure form without employing any difficult separation techniques.

It has now been discovered that difluoroamino-rich compounds can be made safely with considerable facility by carrying out the process in two steps. Instead of reacting an allyl halide-containing compound with tetrafluorohydrazine in one step to form an oxidizer containing several $NF_2$ groups, it is safer and more economical to employ a two-step process in which an allyl difluoroamino-containing compound is recovered in the first step and this is subsequently reacted with additional tetrafluorohydrazine to make the final product.

In carrying out the present process, an allyl halide-containing substance, e.g. allyl bromide, is reacted with tetrafluorohydrazine under conditions which favor the substitution of the halide with an $NF_2$ group but which does not favor the formation of compounds in which $NF_2$ groups are added to the unsaturated bond or bonds. For instance, in the case of allyl bromide the desired product of the first step is allyl difluoroamine. This substance is relatively nonhazardous and can easily be recovered from the reaction mixture by simple distillation. The intermediate product is then reacted with additional tetrafluorohydrazine to produce almost quantitatively the final product, which in the case of allyl difluoroamine is 1,2,3-tris-(difluoroamino) propane. No difficulty is encountered in the purification of this substance since the reactants boil substantially below the boiling point of the final product. Moreover, little or no side reactions occur in the second step of the process due to the absence of reactive substances, such as halogen.

The reaction conditions are not highly critical, although it has been noted that the reactions in both steps can be easily and quickly carried out at elevated temperatures. Generally speaking the reaction temperature for the first step of the process in which the halide is substituted with an $NF_2$ group is about −50 to 350° C. As a practical matter, the reaction temperature should be between 0 and 350° C. since very low temperatures are accompanied by low rates of reaction and higher temperatures may result in decomposition. The reaction may be carried out either in the liquid or vapor phase depending upon the specific conditions employed.

It has been found that temperatures of 150 to 250° C. are quite satisfactory for vapor phase reactions in the first step of the process. The pressure and reaction time in the first step are not critical in that a wide variety of pressures and times may be employed. For instance the pressure may be varied from 10 mm. to 100 atmospheres, although it is usually between 500 mm. and 5 atmospheres. The reaction time is of course dependent upon a number of factors, including the conversion rate, the temperature, etc. Usually it is at least a few seconds and may be as long as several hours or a week at the lower temperatures. In vapor phase reactions it has been noted that reaction times of 1 to 5 minutes are satisfactory. One outstanding advantage of the low temperature, e.g. 20 to 30° C., liquid phase reaction is that substantially no addition reactions take place so that the product is free of the explosive tris compound.

The ratio of the reactants is important in the first step of the process since it is generally desirable to prepare as much of the substituted compound as possible. In general it may be said that at least equimolar amounts of the reactants should be employed and that the formation of the intermediate product is favored by increasing the mole ratio of the allyl halide-containing compound to the tetrafluorohydrazine reactant. Broadly speaking there should be not more than 1 mole of $N_2F_4$ per mole of allylic halogen, and preferably 0.2 to 1 mole of $N_2F_4$ per halogen. For example, the mole ratio of the allyl halide compound to the tetrafluorohydrazine should be about 1 to 10:1. For most purposes, a mole ratio of about 2 to 5:1 is suitable. By using a 5:1 molar ratio it is possible to obtain yields of 50 to 60% of the intermediate product, while at a ratio of about 1:1 the yield is about 30%.

The intermediate product in which the halide has been substituted with an $NF_2$ group is separated from the crude reaction mixture by distillation. The product, which is generally at least 98+% pure, is then reacted with additional tetrafluorohydrazine (second step) to form the final product.

In the second step of the process the difluoroamino-rich compound is formed almost quantitatively when equimolar amounts of the reactants are employed. This of course applies only where there is one double bond in the intermediate compound to which two $NF_2$ groups are to be added. Correspondingly larger amounts of tetrafluorohydrazine are necessary if $NF_2$ groups are being added to two or more double bonds. In fact, it is desirable where reaction rate is important to use an excess of tetrafluorohydrazine even where the intermediate compound has only one double bond. Thus, the mole ratio of tetrafluorohydrazine to the intermediate compound may range from 0.5 to 3:1. Again the reaction may be run either in the liquid or vapor phase, depending upon the conditions employed. In general, the reaction should be carried out at between room temperature and 350° C. and the preferred reaction temperature for vapor phase processes is about 100 to 200° C. Any suitable pressure may be employed and the reaction time is not critical so long as the reactants are contacted for a sufficient time to permit them to form the desired product. The pressure in the reaction zone may be as low as 500 mm. or as high as 10 atmospheres. The reaction time may vary from a few minutes to a day or more. At a reaction temperature of about 200° C. the reaction will be complete in about 10 to 60 minutes, depending upon the other factors affecting the reaction.

Both steps of the process should be carried out in the absence of any reactive gases or liquids. For instance, the reaction atmosphere should be substantially free of oxygen and the reaction vessel should be water free. If desired inert gases, such as nitrogen or helium, may be employed in the liquid phase reactions. The reaction vessel should be made of or lined with an inert substance which will not interfer with the reaction or contaminate the product. A stainless steel tubular reactor has been satisfactorily employed in this process. Other well known inert materials might also be employed.

The allyl halide-containing reactant is an unsaturated compound having a halide, such as chlorine, iodine or bromine, attached to a carbon atom beta to the double bond. If the reactant is a diolefin it may contain two halogen atoms each attached to different carbon atoms which are beta to each double bond. The allyl halide reactant usually contains 3 to 6 carbon atoms and in most instances contains only carbon and hydrogen in addition to the allyl halogen or halogens. Among the allyl halide-containing compounds which may be used in the first step of the present process are allyl bromide, allyl iodide, allyl chloride, 2-bromomethyl allyl bromide, 3-bromo-1,4-pentadiene, 5-bromo-1,3-pentadiene, 3,4-dibromo-1,5-hexadiene and 1,4-dibromo-2-butene.

The tetrafluorohydrazine, which is a gas at ambient temperatures and atmospheric pressure, should be essentially free of substances which interfere with the reaction. It has been found that tetrafluorohydrazine having a purity of at least 99% is satisfactory for both steps of the process.

If the two steps in the process are vapor phase reactions, both reactants may be preheated to the reaction temperature prior to introducing them into the reaction zone which is maintained at the aforementioned temperature. If one of the reactants is a liquid while the other, i.e. tetrafluorohydrazine, is a gas, the gas may be bubbled through the liquid reactant which may or may not be admixed with an inert liquid diluent. While it is usually desirable to introduce substantially pure tetrafluorohydrazine into the reaction zone, it is not intended to exclude from this process the use of reactants which will form tetrafluorohydrazine in situ. For instance, trifluoroamine may be added to a reaction zone that contains copper or carbon which are known to promote the formation of tetrafluorohydrazine. The allyl halide compound may be introduced into the reaction zone either subsequently or concurrently to react with the tetrafluorohydrazine formed therein.

The present process may be carried out either batchwise or continuously. In a continuous process the intermediate product is sent directly to the second reaction zone upon being separated from the crude reaction mixture in the first zone. Any unreacted material, such as the tetrafluorohydrazine may be recovered in a cold trap, e.g. liquid nitrogen, and recycled to either reaction zone.

The process of the present invention will be described in detail in the following examples:

EXAMPLE 1

Allyl bromide is continuously introduced into a stainless steel tubular reactor which has an inside diameter of 0.22 inch and is 20 feet long, together with tetrafluorohydrazine. The two reactants are in contact with each other for 1 minute at 230° C. under one atmosphere of pressure. The mole ratio of allyl bromide to tetrafluorohydrazine in this continuous process is 1.1:1. It is found that equal amounts of allyl difluoroamine and 1,2,3-tris-(difluoroamino) propane are prepared under these conditions.

In another run the process was repeated under the same conditions except that the mole ratio of allyl bromide to tetrafluorohydrazine is 5:1. In this run the mole percent of allyl difluoroamine is more than 5 times that of the yield of the tris compound. These data are set forth in Table I:

TABLE I.—ALLY BROMIDE-$N_2F_4$ REACTION TYPICAL YIELDS

[Continuous stainless-steel tubular reactor, 1 minute contact at 230° C. under 1 atm. of pressure.]

| Products—Mole Ratio, Allyl Bromide/$N_2F_4$ | Mole percent Yield on Allyl Bromide Reacted | |
|---|---|---|
| | 1.1/1 | 5/1 |
| $CH_2=CHCH_2NF_2$ | 33 | 52 |
| $CH_2NF_2CHNF_2CH_2NF_2$ | 33 | 10 |
| $CH_2BrCHBrCH_2Br$ | 22 | 26 |
| $CH_2BrCHBrCH_2NF_2$ and others | 12 | 12 |

The allyl difluoroamine is separated from the crude reaction mixture by charging the mixture to a still adapted with a Dry Ice condenser and recovering the overhead product which boiled at a temperature of 39 to 42° C. The allyl difluoroamine compound obtained in this manner is 98+% pure. In the second step of the process, the allyl difluoroamine (the intermediate product) is further reacted with tetrafluorohydrazine in a mole ratio of 1.0:1.1. A batch reactor is used in the second step of the process and the temperature and pressure are maintained at 175° C. and 15 p.s.i.a., respectively. The two reactants are contacted for 12 hours in the vapor phase in the reactor and it is noted that the final reaction product contains a substantially quantitative yield of 1,2,3-tris-(difluoroamino) propane. The tris compound is 98+% pure and may be used as such without further purification.

The foregoing illustrates how difluoroamino-rich compounds may be prepared without employing difficult separation techniques, such as high temperature distillations which reduce yield. In some cases, as with the allyl difluoroamine, the intermediate product is stable and non-explosive. It can be stored for long periods of time or it may be used immediately to prepare the final product.

Among the difluoroamino-rich compounds which may be prepared in accordance with the present invention are:

1,2,3-tris-(difluoroamino) 2-difluoroaminomethyl propane
1,2,3,4-tetrakis-(difluoroamino) butane
1,2,3,4,5-pentakis-(difluoroamino) pentane
1,2,3,4,5,6-hexakis-(difluoroamino) hexane The foregoing compounds are excellent oxidizing agents and may be used as such in rocket propellants. They also are useful as intermediates in the preparation of nitriles, amines and other nitrogen-containing compounds of known utility. All of the compounds are explosive and therefore can be used as detonators, etc.

The 1,2,3-tris-(difluoroamino) propane compound is particularly suitable as an oxidizing agent for boron fuels. A suitable rocket propellant composition utilizing this oxidizing agent is as follows:

TABLE II

| Component: | Wt. percent |
|---|---|
| 1,2,3-tris-(difluoroamino) propane | 48.0 |
| Tetranitromethane | 39.4 |
| Boron | 2.6 |
| Rubber binder | 10.0 |

This propellant composition has a calculated specific impulse of 282 sec.$^{-1}$.

EXAMPLE 2

Allyl difluoroamine is prepared at room temperature (25° C.) by contacting 5 cc. liquid allyl bromide with a sufficient quantity of gaseous $N_2F_4$ to saturate the liquid. The $N_2F_4$ pressure is 1 atmosphere. The reaction is carried out in a 50 cc. glass bulb for about 7 days. At the end of this time, the reaction mixture is analyzed and it is found that it contains 18.5 wt. percent allyl difluoroamine on an allyl bromide free basis and no 1,2,3-tris-(difluoroamino) propane. The allyl difluoroamine can be separated by distillation and further reacted with $N_2F_4$ to make the tris compound in accordance with Example 1.

It is not intended to restrict the present invention to the foregoing examples which are merely given to demonstrate the invention. It should only be limited to the appended claims in which it is intended to claim all of the novelty inherent in the invention as well as the modifications and equivalents coming within the scope and spirit of the invention.

What is claimed is:

1. Process for making a difluoroamino compound having an $NF_2$ group attached to each carbon atom in the compound, which comprises reacting an allyl halide with tetrafluorohydrazine at a reaction temperature in the range of about minus 50° to 350° C. and for a period such that an $NF_2$ group is substituted for an allylic halogen constituent of said allyl halide to form an allyl difluoroamine, separating the resulting allyl difluoroamine from the resulting reaction mixture, and reacting the separated allyl difluoroamine with additional tetrafluorohydrazine at a temperature in the range of about room temperature to 350° C. for sufficient time and in sufficient proportion to attach $NF_2$ groups to double bonded carbon atoms in said allyl difluoroamine.

2. Process for making a difluoroamino compound having an $NF_2$ group attached to each carbon atom in the compound, which comprises reacting an allyl halide reactant containing 3 to 6 carbon atoms with tetrafluorohydrazine at a reaction temperature in the range of minus 50° to 350° C. for a period in the range of a few seconds to several hours to form an allyl difluoroamine by substitution of an $NF_2$ group for allyl halogen in the allyl halide, said allyl halide being an unsaturated acyclic compound and being mixed in a proportion of 1 to 10 mols per mol of the tetrafluorohydrazine for substitution reaction therewith, separating the resulting substitution reaction product of allyl difluoroamine from the resulting reaction mixture, and reacting the separated allyl difluoroamine with additional tetrafluorohydrazine at a reaction temperature in the range of room temperature to 350° C. for from a few minutes to a day, and in a proportion to saturate double bonds of the allyl difluoroamine reactant by additional reaction with the tetrafluorohydrazine.

3. Process for making a difluoroamino compound having 3 to 6 carbon atoms with an $NF_2$ group attached to each of 3 to 6 carbon atoms in the compound which comprises reacting an allyl halide with tetrafluorohydrazine in vapor phase at 150° to 350° C. for about 1 to 5 minutes, said allyl halide being a halogen substituted acyclic unsaturated hydrocarbon of 3 to 6 carbon atoms containing an allyl halogen attached to a carbon atom beta to a double bond, reacting sufficient amount of the tetrafluorohydrazine with the allyl halide to substitute an $NF_2$ group for the allyl halogen so as to form an allyl difluoroamine, separating the resulting allyl difluoroamine from the resulting reaction mixture, and reacting the separated allyl difluoroamine with tetrafluorohydrazine in a reaction mixture containing one mol of the allyl difluoroamine in proportion to 0.5 to 2 mols of the tetrafluorohydrazine at a reaction temperature in the range of room temperature to 350° C. for about 10 minutes to 1 hour and recovering a tetrafluorohydrazine adduct of the allyl difluoroamine having an $NF_2$ group attached to each of 3 to 6 carbons.

4. Process for making an allyl difluoroamine which comprises reacting an acyclic allyl halide having 3 to 6 carbon atoms with tetrafluorohydrazine under conditions and in proportions to substitute an $NF_2$ group for allyl halogen in said allyl halide at a temperature in the range of minus 50° to 350° C., and separating from the resulting reaction mixture an allyl difluoroamine product obtained by the substitution of an $NF_2$ for the allyl halogen.

5. Process for making 1,2,3-tris-(difluoroamino) propane which comprises reacting 1 to 10 moles allyl bromide with 1 mole tetrafluorohydrazine in the vapor phase at 150 to 250° C. for 1 to 5 minutes, distilling the reaction mixture to recover allyl difluoroamine substantially free of said propane compound and reacting 1 mole of said substantially pure allyl difluoroamine with 0.5 to 3 moles of tetrafluorohydrazine at 100 to 200° C. for about 10 minutes to 1 hour and recovering a substantially quantitative yield of said propane compound.

6. Process according to claim 5 in which the mole ratio of allyl bromide to tetrafluorohydrazine is 2 to 5:1 and the mole ratio of tetrafluorohydrazine to allyl difluoroamine is about 1:1.

7. Process for making 1,2,3-tris-(difluoroamino) propane which comprises reacting 1 to 10 moles of liquid allyl bromide with 1 mole of gaseous tetrafluorohydrazine at about room temperature for a sufficient period of time to make allyl difluoroamine substantially free of said propane compound, separating said allyl difluoroamine from the reaction mixture and reacting 1 mole of said allyl difluoroamine with about 0.5 to 3 moles of tetrafluorohydrazine at 100 to 200° C. for about 10 minutes to 1 hour and recovering a substantially quantitative yield of said propane compound.

No references cited.

CHARLES B. PARKER, *Primary Examiner.*

ROGER L. CAMPBELL, *Examiner.*

J. W. WHISLER, BERNARD BILLIAN,
*Assistant Examiners.*